United States Patent Office 3,541,017
Patented Nov. 17, 1970

3,541,017
DENTURE CLEANSER PREPARATIONS COMPRISING ZIRCONIUM SILICATE AND ZIRCONIUM DIOXIDE
Joseph C. Muhler, Indianapolis, Ind., assignor to Indiana University Foundation, Bloomington, Ind., a not-for-profit corporation of Indiana
No Drawing. Continuation-in-part of application Ser. No. 703,874, Feb. 8, 1968, which is a continuation-in-part of applications Ser. No. 673,283, Oct. 6, 1967, and Ser. No. 558,270, June 17, 1966. This application Feb. 4, 1969, Ser. No. 796,582
Int. Cl. C11d 3/12, 7/10
U.S. Cl. 252—140                                   12 Claims

ABSTRACT OF THE DISCLOSURE

New and more effective cleaning and polishing preparations may be obtained by employing a mixture of zirconium silicate ($ZrSiO_4$) and zirconium dioxide ($ZrO_2$) as a cleaning and polishing constituent thereof, as hereinafter described in detail. Such preparations are especially useful in denture cleanser compositions and in other agents useful in cleaning and polishing acrylic resin materials and the like.

CROSS REFERENCE

This is a continuation-in-part of applicant's copending United States application entitled Denture Cleanser Preparations Comprising Zirconium Silicate and Zirconium Dioxide, Ser. No. 703,874, filed Feb. 8, 1968, now abandoned, which was in turn a continuation-in-part of applicant's application entitled Dentifrice Preparation Ser. No. 673,283, filed Oct. 6, 1967, now U.S. Pat. No. 3,450,-813, and Prophylactic Dental Paste Compositions Comprising Zirconium Silicate and Tin Dioxide, Ser. No. 558,-270, filed June 17, 1966 (now U.S. Pat. No. 3,378,445) which was in turn a continuation-in-part of applications entitled Cleaning and Polishing Agent for Dental Prophylaxis, filed June 11, 1964 (now U.S. Pat. No. 3,330,732) and Prophylactic Dental Paste Compositions Comprising Zirconium Silicate, filed Oct. 8, 1963 (now U.S. Pat. No. 3,257,282).

BACKGROUND OF THE INVENTION

Field of the invention

The present invention relates to cleaning and polishing agents comprising zirconium silicate ($ZrSiO_4$) and zirconium dioxide ($ZrO_2$) and to the formulation and utilization of preparations incorporating such cleaning and polishing agents. In particular, the invention relates to denture cleaning and polishing compositions comprising such cleaning and polishing agents.

Description of the prior art

The difficulty of achieving good oral hygiene has been shown to be no less difficult in individuals using dentures than in individuals having their natural teeth. Dental research has shown that complete and partial dentures are very susceptible to the formation and accumulation of calculus. In addition, the methyl methacrylate portion of dentures and the areas around the neck of the prosthetic teeth are very vulnerable to the formation and accumulation of various stains. Any portion of the denture may be stained by a variety of common agents normally ingested in the human diet. For example, staining on dentures commonly results from the use of tobacco, coffee, tea, certain fruit juices, and some jellies and jams, as well as other types of food.

Experience has shown that many of the foregoing stains are extremely difficult, if not impossible, to remove with the various denture cleansers commercially available at the present time. Moreover, even though extended brushing may sometimes remove the accumulated stains and calculus, the commercial denture cleansers are all found to be deficient in other important respects. For example, many such cleansers leave the surface of the denture with a dull, unpolished finish which promotes the formation of additional stains and films. A highly polished, smooth surface is desirable in that it reduces the susceptibility of the surface to the formation and/or accumulation of calculus, stains, and mouth odors.

In addition, some preparations commonly used for cleaning dentures are excessively abrasive and scratch material from which the denture is made, typically an acrylic resin such as methyl methacrylate. Since the vast majority of denture wearers use a method of brushing, or a combination of brushing and immersion in order to clean their dentures, an abrasive used in combination with a denture cleanser must be carefully chosen and manufactured to maximize the cleaning and polishing properties of the composition and, at the same time, minimize the abrasion of the denture produced by brushing therewith.

Accordingly, it is a primary object of the present invention to produce an effective cleaning and polishing composition.

It is another object of the present invention to produce a composition which cleans and polishes with a minimum of abrasion.

It is another primary object of the present invention to provide a denture cleanser composition incorporating a cleaning and polishing agent of the character described.

Zirconium silicate has, of course, been used in the past as an industrial polishing agent for glass. U.S. Pat. No. 2,427,799 (Maloney, Sept. 23, 1947), describes a zirconium silicate preparation for polishing glass in which at least 90% of the particles used in the preparation have a fineness of two microns or less in diameter. More recently, U.S. Pat. No. 2,694,004 (Coffeen, Nov. 9, 1954), describes a preferred zirconium silicate polishing material in which substantially all particles are essentially in the range of up to about 3 microns. Although Maloney and Coffeen describe zirconium silicate glass polishing agents, they do not suggest that their compositions may be used as polishing agents for softer plastic materials which would be much more susceptible to abrasion than glass such as methyl methacrylate, used in forming dentures. Cooley et al. U.S. Pat. No. 3,151,210 describe dentifrice abrasives embodying $ZrSiO_4$ for use on natural teeth. Cooley et al., however, were able to achieve their objectives only by providing a thermoplastic resin coating on the $ZrSiO_4$. The coating taught by Cooley et al. so alters the $ZrSiO_4$ that it must be emphasized that the $ZrSiO_4$ of the present invention is uncoated and acts directly on the denture surface without interposition of a plastic coating.

SUMMARY OF THE INVENTION

In the aforesaid copending Ser. No. 703,874 application of which this application is a continuation-in-part, it was disclosed that new and more effective cleaning and polishing compositions comprise zirconium silicate ($ZrSiO_4$) having particles in the range of up to about 10 microns and zirconium dioxide ($ZrO_2$) having particles in the range of up to about 50 microns particle size with the majority and preferably at least about 75% of the particles lying between 10 and 20 microns, such mixture comprising at least about 20% and up to about 80% by weight $ZrO_2$ and balance $ZrSiO_4$ (i.e., 4:1 to 1:4 $ZrSiO_4$-$ZrO_2$ weight ratios).

It has now been found that even better results are achieved with mixtures of zirconium silicate having particles in the range of at least about 10 microns and at least about 0.1% by weight of the mixture of micronized zirconium dioxide (i.e., $ZrO_2$ particles of less than about 1 micron particle size).

The subject invention thus has for its generic concept the utilization of zirconium silicate-zirconium oxide mixtures comprising between about 0.1 and 80% by weight $ZrO_2$. In each case, at least about 90 percent of the $ZrSiO_4$ particles lie in the range of up to about 5 microns particle size. The foregoing cleaning and polishing compositions are preferably provided in the denture cleanser composition at a level of about 20–90% by weight of the preparation. Through the use of the cleaning and polishing agents of the present invention, the difficulties experienced with prior art cleaning and polishing compositions may be overcome, and agents of the present invention may be used to formulate compositions having superior cleaning and polishing capabilities and a minimum of abrasiveness.

DESCRIPTION OF THE PREFERRED EMBODIMENTS

In accordance with the subject invention, it has been found that optimal cleaning and polishing characteristics for a cleaning and polishing composition are exhibited through the use of a mixture of zirconium silicate ($ZrSiO_4$) having particles in the range of up to about 10 microns, with at least about 90 percent of the particles lying in the range of up to about 5 microns and zirconium dioxide ($ZrO_2$) having particles in the range of up to about 50 microns particle size. Such mixtures preferably comprise about 0.1 up to about 80% by weight $ZrO_2$.

Where relatively large sized $ZrO_2$ particles are employed, the majority and preferably at least about 75% of the particles lie between 10 and 20 microns. Such a mixture comprises at least about 20% up to about 80% by weight large particle $ZrO_2$ and balance $ZrSiO_4$ (i.e., 4:1 to 1:4 $ZrSiO_4$-$ZrO_2$ weight ratios). Preferably, however, micronized zirconium dioxide ($ZrO_2$), $ZrO_2$ substantially all of which is less than 1 micron particle size is employed, and where this is the case, the mixture should comprise about 0.1 up to about 2.0% by weight $ZrO_2$, preferably about 0.5% by weight $ZrO_2$.

The cleaning and polishing component is preferably present in a denture cleanser preparation at a level of about 20–90% by weight.

The size of particles in cleaning and polishing compositions can be expressed in a number of different ways, one of the most common of which is "mean diameter," i.e., the arithmetical average of the diameters of particles in a representative sample. As hereinafter utilized, the term "particle size" refers to a mean diameter value.

The preparation of suitable particle size zirconium silicate can be accomplished by conventional techniques well known to the art. Basically, these techniques involve milling zirconium silicate ore (zircon), followed by standard screen sieving (or air separation) to segregate the desired particle size. Various milling techniques may be utilized in order to obtain the desired surface configurations for the zirconium silicate particles. Particles may be prepared by a ball milling technique. Preferably, the cleaning and polishing agent of the present invention comprises a mixture of ball milled and hammer milled particles.

As is well known to the art, hammer mills utilize a high speed rotary shaft having a plurality of hammers or beaters mounted thereon. The hammers may be T-shaped elements, bars, or rings fixed or pivoted to the shaft or to discs pivoted to the shaft. The shaft runs in a housing containing grinding plates or liners. The grinding action results from the impact between the material being milled and the moving hammers. When zircon ore is milled by an attrition technique, such as hammer milling, relatively rough, jagged particles are produced. Particles having such a jagged surface configuration function from a denture cleaning standpoint in a relatively superior manner as compared to more smoothly configured particles.

Similarly, a ball mill comprises a cylindrical or conical shell rotating on a horizontal axis which is charged with a grinding medium such as balls of steel, flint, or porcelain. The grinding is accomplished by the tumbling action of the balls on the material to be ground. Particles of zirconium silicate treated in a ball mill of the character described have relatively smooth surface configurations and function better from a polishing standpoint than more jaggedly configured particles.

As previously noted, the zirconium silicate utilized in accordance with the present invention has particles lying in the range of up to about 10 microns, with at least about 90% of the particles lying in the range of up to about 5 microns.

Zirconium dioxide, $ZrO_2$, may be obtained by the same well known milling and sieving techniques, with the particles lying in the range of up to about 50 microns particle size. Preferably, the $ZrO_2$ particles are micronized, that is, they are substantially all less than 1 micron in particle size, such particles being capable of imparting a high degree of polish to the surface to be treated. Where the relatively large $ZrO_2$ particles are employed, the bulk of the $ZrO_2$ particles (i.e., preferably at least about 75%) lie in the range of about 10–20 microns with the remainder being substantially equally divided between the range of 0–10 microns and 20–50 microns. An especially approved large $ZrO_2$ mixture formulation comprises about 86% particles between 10 and 20 microns, about 8% between 0 and 10 microns, and about 6% between 20 and 50 microns.

Where micronized $ZrO_2$ is employed, the cleaning and polishing agent of the present invention comprises relative proportions of $ZrSiO_4$ and $ZrO_2$ within the range of about 0.1 up to about 2.0% $ZrO_2$, with the balance being $ZrSiO_4$. Optimal results are achieved with about 0.5% $ZrO_2$, by weight of the cleaning and polishing agent.

Where relatively large $ZrO_2$ particles are used, the cleaning and polishing agents of the present invention comprise relative proportions of $ZrSiO_4$ and $ZrO_2$ within the range of about 20% up to about 80% by weight $ZrO_2$, with the balance being $ZrSiO_4$ (i.e., a 4:1 to 1:4 $ZrSiO_4$-$ZrO_2$ weight ratio range). Preferably such agents comprise about 20–50% $ZrSiO_4$ and about 50–80% $ZrO_2$ (i.e., about a 1:1–1:4 $ZrSiO_4$-$ZrO_2$ weight ratio). Best results are achieved with a 1:3 $ZrSiO_4$-$ZrO_2$ mixture.

The zirconium silicate ($ZrSiO_4$) and zirconium dioxide ($ZrO_2$) cleaning and polishing agents of the present invention are generally employed in denture cleanser preparations within the range of from about 20% up to about 90% by weight, depending on the particular formulation desired, as is well known to one skilled in the art. Denture cleansers in paste form preferably contain a total of about 20–70% cleaning and polishing agents by weight, whereas denture cleansers in powder form preferably contain about 60–90% cleaning and polishing agents by weight.

Denture preparations utilizing the cleaning and polishing agents of the subject invention are prepared in a conventional manner and will usually include additional ingredients which render the overall composition commercially acceptable to consumers.

More specifically, a denture paste generally requires a binder substance to impart desired textural properties. Natural gum binders such as gum tragacanth, gum karaya, gum arabic, etc.; seaweed derivatives such as Irish moss and alginates; and water soluble cellulose derivatives, such as hydroxyethyl cellulose and sodium carboxymethyl cellulose can be used for this purpose. Improvements in texture can also be attained by including an additional material such as colloidal magnesium aluminum silicate.

Thickening agents in an amount from 0.5 to 5.0% by weight can be used to form a satisfactory denture paste.

Denture pastes also conventionally contain sudsing agents. Suitable sudsing agents include, but are not limited to, water soluble alkyl sulfates having 8 to 18 carbon atoms in the alkyl radical such as sodium lauryl sulfates, water soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmityl tauride, and salts of fatty acid esters of isethionic acid.

Sudsing agents can be used in the compositions of this invention in an amount of from about 0.5 to about 5.0% by weight of the total composition.

It is also desirable to include some humectant material in a denture paste to keep it from hardening. Materials commonly used for this purpose include glycerine, sorbitol, and other polyhydric alcohols. Humectant materials may comprise up to 35% by weight of the denture paste composition.

Compositions of exemplary denture formulations employing the cleaning and polishing agents of the present invention are given in the following examples.

Examples I and II illustrate preferred compositions of the present invention comprising micronized zirconium dioxide.

EXAMPLE I

| Constituent: | Parts by weight (percent) |
|---|---|
| Zirconium silicate | 47.31 |
| Zirconium dioxide (micronized) | 0.22 |
| Distilled water | 19.47 |
| Glycerine | 13.00 |
| Sorbitol (70% aqueous solution) | 14.00 |
| Sodium monoglyceride sulfonate | 1.00 |
| Sodium lauryl sulfate | 1.00 |
| Veegum (magnesium aluminum silicate) | 1.00 |
| Sodium carboxymethyl cellulose | 1.00 |
| Flavorings, colorings, etc. | 2.00 |

EXAMPLE II

| Constituent: | Parts by weight (percent) |
|---|---|
| Zirconium silicate | 48.55 |
| Zirconium dioxide (micronized) | 0.06 |
| Distilled water | 18.39 |
| Glycerine | 13.00 |
| Sorbitol (70% aqueous solution) | 14.00 |
| Sodium monoglyceride sulfonate | 1.00 |
| Sodium lauryl sulfate | 1.00 |
| Veegum (magnesium aluminum silicate) | 1.00 |
| Sodium carboxymethyl cellulose | 1.00 |
| Flavorings, colorings, etc. | 2.00 |

Example III illustrates an exemplary denture cleanser formulation employing a preferred 1:3 weight mixture of zirconium silicate and large particle zirconium dioxide.

EXAMPLE III

| Constituent: | Parts by weight (percent) |
|---|---|
| Zirconium silicate | 12.00 |
| Zirconium dioxide | 36.00 |
| Distilled water | 19.00 |
| Glycerine | 13.00 |
| Sorbitol (70% aqueous solution) | 14.00 |
| Sodium coconut monoglyceride sulfonate | 1.00 |
| Sodium lauryl sulfate | 1.00 |
| Veegum (magnesium aluminum silicate) | 1.00 |
| Sodium carboxymethyl cellulose | 1.00 |
| Flavorings, colorings, etc. | 2.00 |

The following examples give further exemplary denture cleanser formulations comprising zirconium silicate and zirconium dioxide cleaning and polishing agents.

EXAMPLE IV

| Constituent: | Parts by weight (percent) |
|---|---|
| Zirconium silicate | 24.00 |
| Zirconium dioxide | 24.00 |
| Distilled water | 19.00 |
| Glycerine | 13.00 |
| Sorbitol (70% aqueous solution) | 14.00 |
| Sodium coconut monoglyceride sulfonate | 1.00 |
| Sodium lauryl sulfate | 1.00 |
| Veegum (magnesium aluminum silicate) | 1.00 |
| Sodium carboxymethyl cellulose | 1.00 |
| Flavorings, colorless, etc. | 2.00 |

EXAMPLE V

| Constituent: | Parts by weight (percent) |
|---|---|
| Zirconium silicate | 10.00 |
| Zirconium dioxide | 40.00 |
| Distilled water | 17.00 |
| Glycerine | 13.00 |
| Sorbitol (70% aqueous solution) | 14.00 |
| Sodium coconut monoglyceride sulfonate | 1.00 |
| Sodium lauryl sulfate | 1.00 |
| Veegum (magnesium aluminum silicate) | 1.00 |
| Sodium carboxymethyl cellulose | 1.00 |
| Flavorings, colorless, etc. | 2.00 |

EXPERIMENTAL EVALUATIONS

The superior cleaning, polishing, and abrasion properties of the zirconium silicate and zirconium oxide mixtures of the present invention have been established by the following experimental evaluations. Basically, the polishing and abrasion properties of the materials tested are established by applying test abrasives to methyl methacrylate blocks, and the cleaning properties thereof are established by applying the abrasives to plexiglass blocks.

To carry out the polishing procedure, ½" square heat-cured methyl methacrylate blocks are prepared so that the surface to be polished is smooth and free from defects. The surface is then dulled with a green Dedico rubber wheel mounted on a standard dental handpiece. The blocks are then positioned on a micrometer mount of a reflectometer, and an initial reflectometer reading is recorded using low beam intensity. The test compositions are mixed using 25.0 grams of abrasive and 50 ml. of an aqueous 1.0 percent carboxymethyl cellulose solution. Thereafter, the test blocks are mounted on a toothbrushing machine, and the test composition is applied to the test surface thereof by soft toothbrushes under 150 grams tension using 1,000 double strokes. After the brushing procedure is completed, the numbered blocks are removed, thoroughly rinsed with distilled water, and blotted dry with soft absorbent tissue. The blocks are then remounted on the reflectometer, and the highest reflectance reading on any part of the surface of each block is recorded as a final reading. The difference between the average final readings and average initial readings is used as an indication of the relative polishing ability of the test agent.

The relative cleaning ability of abrasives is measured by preparing ½" square plexiglass blocks. Prior to use, the blocks are protected by adhesive paper to prevent scratching the surface thereof. In order to perform the procedure, the adhesive backing is removed from one side of each block to be used, and the exposed side is cleaned to remove all foreign material. The blocks are then laid out under a ventilating hood in groups of five or six.

After drying, the blocks are sprayed with an enamel paint mixed with ethyl acetate at a 1:1 ratio and are covered with ethyl acetate-soaked Dixie cups. After drying for about two hours, the painting and covering procedure is repeated, and the blocks are allowed to dry for approximately twenty-four hours.

The reflectometer used in connection with the cleaning procedure is standardized by adjusting the reading to an arbitrary number of 5.0 when a high intensity beam is reflected from a black carrara glass standard held in a fixed micrometer position. When the reflectometer is standardized in the foregoing manner, the dried, painted blocks should each provide a reading of approximately 6.0. Those which do not provide a reading of 6.0 generally have an uneven surface of paint mixture and are discarded.

The test compositions are mixed using 25.0 grams of a test abrasive and 50.0 ml. of an aqueous 1.0% carboxymethyl cellulose solution. Subsequently, the blocks are numbered and mounted on a brushing machine. The test composition is applied to the surface of the block by soft toothbrushes using 150 grams of tension and 1,000 strokes. The blocks are then removed from the brushing machine, washed with distilled water, and blotted dry with soft absorbent tissue. Each block is then individually placed on the reflectometer mount, and the lowest reading is recorded. The difference between the initial, or control reading of approximately 6.0, and the final, post-brushing reading is taken as an indication of the cleaning ability of the test composition.

In order to evaluate the abrasive properties of a test composition, a weight loss procedure is used. Numbered methyl methacrylate blocks are prepared and placed in a humidor for six to eight hours. Then the blocks are allowed to dry for one hour and are weighed on an analytical balance. The weight is recorded as an initial wet weight. The blocks are then dried in air at 65° C. for three hours, allowed to cool for 20 minutes, and again weighed on an analytical balance. The second weight is recorded as an initial dry weight.

A test composition is mixed using 25.0 grams of abrasive and 50.0 ml. of an aqueous 3.0% carboxymethyl cellulose solution. In order to test the composition, blocks are mounted on a brushing machine, and the composition is aplied to the surface of the blocks with medium brushes using 150 grams of tension and 50,000 double strokes. A stirrer is mounted on the brush holder in order to keep the test abrasive in solution and prevent settling out of the particles.

After the brushing procedure, the blocks are removed from the brushing machine and thoroughly rinsed with distilled water in order to remove all traces of the abrasive. The blocks are then blotted dry with soft, absorbent tissue and allowed to air dry for one hour. The blocks are again weighed on an analytical balance, and the resulting weight is recorded as a final wet weight. The blocks are then air dried at 65° C. for three hours and are bench cooled for 20 minutes. Subsequently, the blocks are again weighed, and the resulting weight is recorded as a final dry weight. The average of the wet weights and the dry weights is taken as the weight loss of the acrylic blocks due to abrasion, and the results are recorded in milligrams of weight loss.

Cleaning and polishing scores were obtained in the foregoing manner for a $ZrSiO_4$-micronized $ZrO_2$ mixture comprising about 0.5% $ZrSiO_4$, for a 1:3 weight mixture of zirconium silicate and zirconium dioxide, and, for comparative purposes, similar values were obtained for several commercially available denture cleansers embodying as their predominant cleaning and polishing components the widely used denture cleanser abrasives, calcium hydrogen phosphate dihydrate, $CaHPO_4 \cdot 2H_2O$, sodium carbonate, $Na_2CO_3 \cdot 10H_2O$, and sodium bicarbonate, $NaHCO_3$. These data, which are reported in Table I, demonstrate that, at a minimum, at least a 35% improvement in polishing efficacy (over 100% in the case of the micronized $ZrO_2$ agent) is achieved with the present invention without any reduction in cleaning performance. Indeed, the cleaning value achieved with the mixture of the present invention is at least 5% higher (19% in the case of the micronized $ZrO_2$ agent) than the values for $CaHPO_4 \cdot 2H_2O$.

Similarly, the agents of the present invention are substantially less abrasive than conventional agents. Heat-cured acrylic abrasion values on both a wet and a dry basis for a 1:3 $ZrSiO_4$-$ZrO_2$ weight mixture and for the same commercial denture cleansers were obtained in the foregoing manner, and these data, which are also given in Table I, show that the agents of the present invention are substantially less abrasive (i.e., at a minimum, over 30% less abrasive, and over 40% in the case of the micronized $ZrO_2$ agent) than $CaHPO_4 \cdot 2H_2O$.

TABLE I

| Denture cleanser principal ingredient | Acrylic polishing score | Cleaning score | Acrylic abrasion (mg. loss) Wet | Acrylic abrasion (mg. loss) Dry |
|---|---|---|---|---|
| NaCl | 0.80 | 1 0.33±0.11 | N.A.2 | N.A. |
| $Na_2CO_3 + Na_2CO_3 \cdot 10H_2O$ | 0.70 | 0.38±0.05 | N.A. | N.A. |
| $Na_2HPO_4$ | 1.50 | 0.43±0.08 | N.A. | N.A. |
| $NaHCO_3 + NaBO_3 \cdot H_2O$ | 1.30 | 0.43±0.13 | N.A. | N.A. |
| $Na_3PO_4 + Na_2CO_2$ | 0.60 | 0.50±0.11 | N.A. | N.A. |
| $Na_2CO_3 + Na_5P_3O_{10}$ (II) | 1.70 | 0.30±0.07 | N.A. | N.A. |
| $NaHCO_3$ | 1.60 | 0.40±0.08 | N.A. | N.A. |
| $NaHCO_3 + Na_2CO_3 \cdot 10H_2O$ | 0.50 | 0.43±0.09 | N.A. | N.A. |
| $CaHPO_4 \cdot 2H_2O$ | 2.25 | 4.80±0.18 | 7.50±0.78 | 8.23±0.97 |
| $CaHPO_4 \cdot 2H_2O$ | 1.15 | 4.90±0.14 | 6.63±0.79 | 5.90±0.81 |
| $ZrSiO_4 + ZrO_2$ (1:3) 3 | 3.05 | 5.15±0.13 | 4.43±0.63 | 3.68±0.75 |
| $ZrSiO_4 + ZrO_2$ (94:6) 4 | 4.54 | 5.84±0.15 | 4.21±0.49 | 3.52±0.67 |

1 Standard error of the mean.
2 Not applicable (no insoluble abrasive present in the system).
3 Formulation of Example III.
4 Formulation of Example I.

The variation in cleaning and polishing efficacy for various $ZrSiO_4$-large particle $ZrO_2$ mixtures has been experimentally determined in the foregoing manner and is reported in Table II. These data illustrate the efficacy of the present invention covers wide ranges in $ZrSiO_4$-large particle $ZrO_2$ content (i.e., about 1:4 to 4:1 $ZrSiO_4$-large particle $ZrO_2$ mixtures), with a 1:3 mixture being preferred.

TABLE II

| Abrasive system relative parts by weight | | Acrylic polishing score | Cleaning score (mg. wt. loss) |
|---|---|---|---|
| $ZrSiO_4$ | $ZrO_2$* | | |
| 100 | 0 | 2.55 | 1.90 |
| 80 | 20 | 2.85 | 1.95 |
| 75 | 25 | 2.85 | 2.00 |
| 67 | 33 | 2.95 | 1.99 |
| 50 | 50 | 3.60 | 1.95 |
| 33 | 67 | 4.40 | 1.85 |
| 25 | 75 | 4.50 | 1.95 |
| 20 | 80 | 4.10 | 1.85 |
| 0 | 100 | 3.70 | 1.60 |

* Relatively large particle $ZrO_2$ (bulk in the 10-20 micron range).

Data showing the variation in polishing effectiveness for various $ZrSiO_4$-$ZrO_2$ compositions is given in Table III, and these data establish that the addition of only 0.06% micronized $ZrO_2$ by weight of the entire cleanser (about 0.12% by weight of the cleaning and polishing mixture) appears to improve the results over those achieved with each of the constituents separately.

TABLE III.—SUMMARY OF ACRYLIC POLISHING DATA

| Cleaning and polishing agents [1] | | | Polishing data [4] | | | | | |
|---|---|---|---|---|---|---|---|---|
| | | | 100 strokes | | 500 strokes | | 1,000 strokes | |
| $ZrSiO_4$ | $ZrO_2$ [2] | $ZrO_2$ [3] | Polishing score | Polishing increment | Polishing score | Polishing increment | Polishing score | Polishing increment |
| 49.00 | | | 2.05±0.14 | 0.55±0.14 | 2.98±0.27 | 1.48±0.27 | 4.31±0.24 | 2.81±0.24 |
| | 49.00 | | 1.99±0.03 | 0.49±0.03 | 2.77±0.14 | 1.26±0.14 | 4.34±0.23 | 2.84±0.23 |
| | | 24.50 | 1.98±0.10 | 0.48±0.10 | 3.06±0.27 | 1.56±0.27 | 4.39±0.42 | 2.89±0.42 |
| 48.22 | 0.78 | | 1.96±0.10 | 0.46±0.10 | 3.28±0.15 | 1.78±0.15 | 4.20±0.37 | 2.70±0.37 |
| 47.63 | 1.32 | | 2.51±0.36 | 1.01±0.36 | 3.85±0.30 | 2.35±0.30 | 4.34±0.23 | 2.84±0.23 |
| 46.06 | 2.94 | | 2.84±0.12 | 1.34±0.12 | 4.19±0.11 | 2.69±0.11 | 4.78±0.23 | 3.28±0.23 |
| 43.12 | 5.88 | | 2.49±0.11 | 0.99±0.11 | 4.18±0.20 | 2.68±0.20 | 4.75±0.08 | 3.25±0.08 |
| 48.55 | | 0.06 | 2.16±0.12 | 0.66±0.12 | 5.01±0.22 | 3.51±0.22 | 4.24±0.29 | 2.74±0.29 |
| 48.22 | | 0.10 | 2.78±0.14 | 1.28±0.14 | 3.88±0.21 | 2.38±0.21 | 5.11±0.16 | 3.61±0.16 |
| 47.31 | | 0.22 | 3.29±0.31 | 1.79±0.31 | 5.41±0.19 | 3.91±0.19 | 6.04±0.33 | 4.54±0.33 |
| 45.62 | | 0.44 | 2.73±0.07 | 1.23±0.07 | 4.34±0.26 | 2.85±0.26 | 4.95±0.28 | 3.45±0.28 |
| 42.24 | | 0.88 | 2.91±0.18 | 1.41±0.18 | 4.93±0.17 | 3.43±0.17 | 5.13±0.12 | 3.63±0.12 |

[1] Expressed as percent of entire denture cleanser composition, assuming the cleaning and polishing system comprises 49% thereof.
[2] Relatively large particle size $ZrO_2$.
[3] Micronized $ZrO_2$.
[4] Expressed as mean ± standard error of the mean.

Thus, the zirconium silicate-zirconium dioxide agents of the present invention, particularly the micronized $ZrO_2$ agents, satisfy the three basic criteria utilized to evaluate a denture cleanser composition; namely, high cleaning and polishing ability, yet minimal abrasion.

Furthermore, while the subject invention has been described with particular reference to the utilization of zirconium silicate and zirconium dioxide agents to clean and polish dentures formed of acrylic resin materials, it should be understood that the subject invention further comprehends the use of these agents to clean and polish, not only dentures formed of other materials, but also other articles formed of acrylic resins and similar plastics. Indeed, the agents of the present invention are believed to be useful for all cleaning and polishing purposes requiring the precise combination of cleaning and polishing ability and low abrasion exhibited by the agents of the present invention.

I claim:

1. A cleaning and polishing composition consisting essentially of a mixture of about 0.1 up to about 80% by weight uncoated zirconium dioxide, $ZrO_2$, having particles lying in the range of up to about 50 microns particle size and balance uncoated zirconium silicate, $ZrSiO_4$, having particles lying in the range of up to about 10 microns particles size.

2. A composition, as claimed in claim 1, wherein at least 90% of the zirconium silicate particles lie in the range of up to about 5 microns particle size and substantially all of the zirconium dioxide particles are less than about 1 micron particle size, the said mixture comprising about 0.1–2.0% zirconium dioxide and balance zirconium silicate.

3. A composition, as claimed in claim 2, wherein the mixture comprises about 0.5% by weight zirconium dioxide.

4. A composition, as claimed in claim 1, wherein at least about 90% of the zirconium silicate particles lie in the range of up to about 5 microns particle size and at least about 75% of the zirconium dioxide particles lie between about 10 and 20 microns particle size, the said mixture comprising about 20–80% by weight zirconium dioxide and 80–20% by weight zirconium silicate.

5. A composition, as claimed in claim 4, wherein the ratio of parts by weight of zirconium dioxide to parts by weight of zirconium silicate lies in the range of about 1:1 to about 3:1.

6. A composition, as claimed in claim 4, wherein the ratio of parts by weight of zirconium dioxide to parts by weight of zirconium silicate is about 3:1.

7. A denture cleanser composition suitable for cleaning and polishing dentures without undue abrasion consisting essentially of a mixture of about 0.1 up to about 80% uncoated zirconium dioxide, $ZrO_2$, by weight of the mixture, the zirconium dioxide having particles lying in the range of up to about 50 microns and about 0.5–5.0% of at least one thickening agent, about 0.5–5.0% of at least one sudsing agent and up to about 35% of at least one humectant all by weight of the composition, and the balance uncoated zirconium silicate, $ZrSiO_4$, having particles lying in the range of up to about 10 microns, the said mixture being present in the denture cleanser composition at a level of about 20–80% by weight of the composition.

8. A composition, as claimed in claim 7, wherein at least 90% of the zirconium silicate particles lie in the range of up to about 5 microns particle size and substantially all of the zirconium dioxide particles are less than about 1 micron particle size, the said mixture comprising about 0.1–2.0% zirconium dioxide and balance zirconium silicate.

9. A composition, as claimed in claim 8, wherein the mixture comprises about 0.5% by weight zirconium dioxide.

10. A composition, as claimed in claim 7, wherein at least about 90% of the zirconium silicate particles lie in the range of up to about 5 microns particle size and at least about 75% of the zirconium dioxide particles lie between about 10 and 20 microns particle size, the said mixture comprising about 20–80% by weight zirconium dioxide and 80–20% by weight zirconium silicate.

11. A composition, as claimed in claim 10, wherein the ratio of parts by weight of zirconium dioxide to parts by weight of zirconium silicate lies in the range of about 1:1 to about 3:1.

12. A composition, as claimed in claim 10, wherein the ratio of parts by weight of zirconium dioxide to parts by weight of zirconium silicate is about 3:1.

References Cited

UNITED STATES PATENTS

| 2,427,799 | 9/1947 | Maloney | 51—308 |
| 3,071,455 | 1/1963 | Harman et al. | 51—308 |
| 3,151,027 | 9/1964 | Cooley et al. | 424—49 |
| 3,257,282 | 6/1966 | Muhler | 424—52 |
| 3,330,732 | 7/1967 | Muhler | 424—49 |
| 3,378,445 | 4/1968 | Muhler | 424—49 |

LEON D. ROSDOL, Primary Examiner

W. E. SCHULZ, Assistant Examiner

U.S. Cl. X.R.

51—308; 106—35; 252—89; 424—49